United States Patent
Bechtel et al.

(10) Patent No.: US 6,654,079 B2
(45) Date of Patent: Nov. 25, 2003

(54) LIQUID CRYSTAL COLOR DISPLAY SCREEN COMPRISING A PHOSPHOR LAYER

(75) Inventors: Helmut Bechtel, Roetgen (DE); Hans Nikol, Aachen (DE); Cornelis Ronda, Aachen (DE); Thomas Jüstel, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 284 days.

(21) Appl. No.: 09/759,186

(22) Filed: Jan. 12, 2001

(65) Prior Publication Data

US 2001/0043294 A1 Nov. 22, 2001

(30) Foreign Application Priority Data

Jan. 14, 2000 (DE) .......................... 100 01 188

(51) Int. Cl.⁷ ............................................. G02F 1/1335
(52) U.S. Cl. ..................... 349/70; 349/64; 349/110
(58) Field of Search ..................... 349/70, 64, 110; 347/255

(56) References Cited

U.S. PATENT DOCUMENTS

| | | | | |
|---|---|---|---|---|
| 4,216,408 A | * | 8/1980 | Verstegen et al. ............ 313/468 |
| 4,822,144 A | | 4/1989 | Vriens ........................ 350/339 |
| 5,166,236 A | * | 11/1992 | Alexander et al. .......... 524/111 |
| 5,396,406 A | * | 3/1995 | Ketchpel .................... 362/27 |
| 5,608,554 A | * | 3/1997 | Do et al. .................... 349/70 |
| 5,666,174 A | * | 9/1997 | Cupolo, III .................. 349/64 |
| 5,949,469 A | * | 9/1999 | Stephenson ................. 347/255 |

FOREIGN PATENT DOCUMENTS

JP 48095387 * 12/1973 ........... C09K/11/46

* cited by examiner

Primary Examiner—Robert H. Kim
Assistant Examiner—P. R. Akkapeddi
(74) Attorney, Agent, or Firm—Dicran Halajian

(57) ABSTRACT

A liquid crystal color display screen is provided with an electro-optical medium, two parallel transparent substrates by which the electro-optical medium is flanked, a device that influences the transmission state of the electro-optical medium, and a phosphor layer having at least two phosphors on the first substrate. A radiation source emits radiation having a maximum emission at a wavelength $\lambda_1 < 360$ nm. The radiation source is situated at the side of the second substrate. The screen also includes a UV phosphor that transforms the radiation having a maximum emission at a wavelength $\lambda_1 < 360$ nm to radiation having a maximum emission at a wavelength $\lambda_2 > 360$ nm.

20 Claims, 1 Drawing Sheet

LIQUID CRYSTAL COLOR DISPLAY SCREEN COMPRISING A PHOSPHOR LAYER

Figure 1:
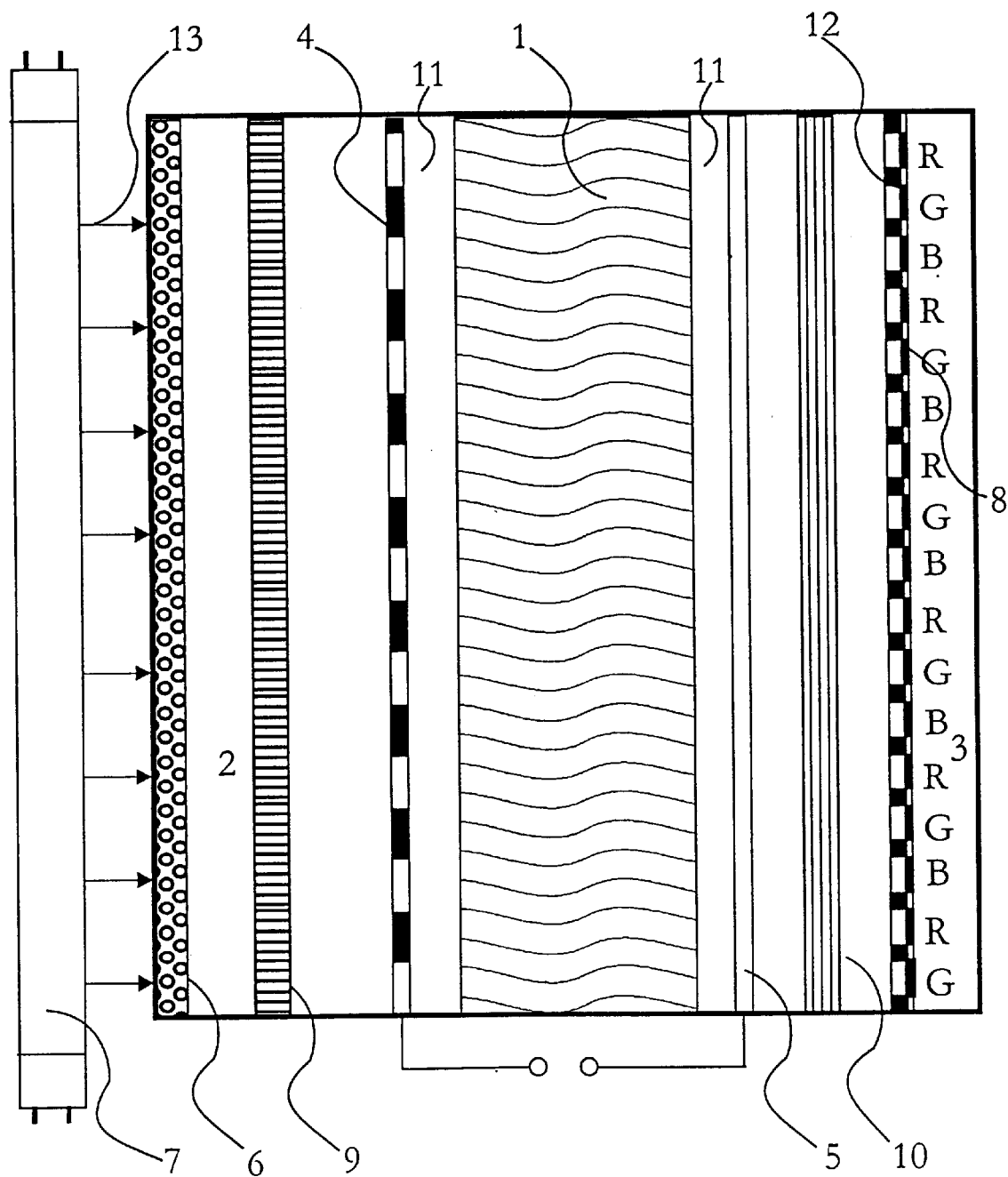

The invention relates to a liquid crystal color display screen provided with an electro-optical medium, two parallel transparent substrates by which the electro-optical medium is flanked, means to influence the transmission state of the electro-optical medium, a phosphor layer comprising at least two phosphors, which is situated on the first substrate, and a radiation source for generating radiation having a maximum emission at a wavelength $\lambda_1 < 360$ nm, which radiation source is situated at the side of the second substrate.

The principle of a liquid crystal display screen is based on the fact that, by applying an electric field, the molecular orientation of liquid organic substances, behaving optically like birefringent crystals, can be controlled such that the direction of polarization of extraneous, incident, linearly polarized light is influenced.

A conventional liquid crystal display screen is generally composed of two glass plates, which are each coated at the inside with a transparent electrode of indium tin oxide (ITO). In the case of TN-liquid crystal display screens (TN=twisted nematic), a 90° rotated edge orientation between the two plates is imposed on the liquid crystal molecules by orientation layers. As a result, a 90° helix arises in the liquid crystal molecules. Crossed polarizers on the outer surfaces of the glass plates and a two-dimensional backlighting complete the display screen. As long as no electric voltage is applied to the two ITO electrodes, the light originating from the backlighting, which is linearly polarized by the first polarizer, can follow the rotation through 90 degrees of the liquid crystal molecules and, subsequently, pass through the second polarizer; the display screen appears transparent. If a sufficiently high voltage is applied, the electric anisotropy of the liquid crystal molecules causes the helix to be removed and the direction of polarization remains uninfluenced. The polarized light cannot pass through the second polarizer, and the cell appears dark.

A complete picture is composed of a plurality of individual elements, which are each driven as light valves by means of a matrix. As regards the drive, a distinction is made between passive and active matrices. At present, the majority of the liquid crystal display screens produced worldwide are driven by a passive matrix, rendering necessary the use of transparent strip electrodes on both glass plates. In the case of liquid crystal display screens driven by an active matrix, each pixel is associated with a switch of its own, which may consist of a thin-film transistor (TFT) or a thin-film diode (TFD). Liquid crystal display screens comprising an active matrix exhibit, all in all, a better contrast and a higher color saturation in combination with a shorter rise time. In the case of colored liquid crystal display screens, each pixel is composed of three, individually driven elements for the colors red, blue and green. In conventional liquid crystal display screens, mosaic color filters, which are pressed onto the front glass plate, are responsible for the color rendition.

A drawback of the conventional liquid crystal color display screens comprising color filter layers resides in that the display screen can only be looked at from specific viewing angles, and the color saturation, luminous intensity and brightness are clearly inferior as compared to CRT display screens.

Liquid crystal color display screens comprising a phosphor layer have a higher luminous intensity and a larger viewing angle.

For example, U.S. Pat. No. 4,822,144 discloses a liquid crystal color display screen which is operated in the transmission mode and is based on a combination of liquid crystal switching elements and a phosphor layer, said phosphor layer being excited by a UV light source, and the brightness of the display screen being increased by an interference filter between the light source and the phosphor layer. The phosphor layer and the UV source may be situated at two remote sides of the liquid crystal switching elements. The UV source may be a mercury high-pressure lamp, which emits light with a maximum emission in the range between 360 and 380 nm, or a mercury low-pressure gas discharge lamp which emits light with a maximum emission at 254 nm.

Backlighting using a mercury high-pressure lamp having a maximum emission at wavelengths between 360 and 380 nm has the drawback that, apart from short-wave light, also light of substantial intensity is emitted at 408, 435 and 546 nm. This leads to an incomplete division into the three primary colors red, green and blue in the phosphors, and to chromatic aberration of the image displayed on the display screen.

Backlighting using a mercury low-pressure lamp having a maximum emission at a wavelength of 254 nm has the drawback that light of this wavelength is absorbed in the liquid crystal material, leading to photochemical reactions which may destroy the liquid crystal material in the course of time.

Therefore, it is an object of the invention to provide a liquid-crystal color display screen which yields a color-pure image and has a long service life.

In accordance with the invention, this object is achieved by a liquid crystal color display screen, which is provided with an electro-optical medium, two parallel transparent substrates by which the electro-optical medium is flanked, means for influencing the transmission state of the electro-optical medium, a phosphor layer comprising at least two phosphors on the first substrate, and a radiation source for emitting radiation having a maximum emission at a wavelength $\lambda_1 < 360$ nm, which radiation source is situated at the side of the second substrate, and means for transforming the radiation having a maximum emission at a wavelength $\lambda_1 < 360$ nm to radiation having a maximum emission at a wavelength $\lambda_2 > 360$ nm.

By virtue thereof, the color purity of the color pixels and hence the color-fast, complete color mixture on the color display screen is improved. Photochemical reactions between the backlighting and the electro-optical medium are precluded.

In accordance with a preferred embodiment of the invention, the means for transforming the radiation is a UV phosphor.

The UV phosphor may be selected from the group formed by $Ca_{2.45}B_{5.5}P_2O_{15.75}:Ce^{3+}Li^+$; $SrB_4O_7:Eu^{2+}$; $Sr_3(PO_4)_2:Sn^{2+}$; $Ba_2Mg(BO_3)_2:Pb^{2+}$; $LaGd(BO_3)_2:Ce^{2+}$; $CaSO_4:Eu^{2+}$; $ZnO:Ga^{3+}$; $CaO:Bi^{3+}$; $(Sr,Mg)_2P_2O_7:Eu^{2+}$; $CaB_2P_2O_9:Eu^{2+}$ and $Sr_2P_2O_7:Eu^{2+}$.

In accordance with a particularly preferred embodiment of the invention, the radiation source for radiation having a maximum emission at a wavelength $\lambda_1 < 360$ nm is a mercury low-pressure lamp. A backlighting comprising a mercury low-pressure lamp proved to be very advantageous, as it very efficiently excites the UV phosphors.

It may also be preferred that the electro-optical medium is a liquid crystal cell medium having a 180°–360° twist.

In a variant of the liquid crystal color display screen, the phosphor layer comprises a red phosphor selected from the group $Y(V,P,B)O_4:Eu$; $Mg_4GeO_{5.5}F:Mn$; $YNbO_4:Eu^{3+}$;

$Y_2O_2S:Eu^{3+}$; $Eu(ttfa)_3(Clphen)Eu(ttfa)_3(phen)$ and $Eu(tfnb)_3(dpphen)$. The luminous intensity in the red range achieved by means of these phosphors, and the resultant optical efficiency, are very high.

In another variant of the liquid crystal color display screen, the phosphor layer comprises a blue phosphor selected from the group $BaMgAl_{10}O_{27}:Eu$. The luminous intensity in the blue range achieved by means of these phosphors, and the resultant optical efficiency, are very high.

In a further variant of the liquid crystal color display screen, the phosphor layer comprises a green phosphor selected from the group $BaMgAl_{10}O_{27}:Mn,Eu$; $Tb(bph4COO)_3(HOEt)_2$, $Tb(dmbtacn)_3(HOEt)_2$ and $Tb(benz)_3(HOEt)_2$. The luminous intensity in the green range achieved by means of these phosphors, and the resultant optical efficiency, are very high.

These and other aspects of the invention will be apparent from and elucidated with reference to the embodiment(s) described hereinafter.

In the drawing:

FIG. 1 is a cross-sectional view of a liquid crystal color display screen in accordance with an embodiment of the invention.

A liquid crystal color display screen in accordance with the invention is provided with an electro-optical medium 1, two parallel transparent substrates 2 and 3 by which the electro-optical medium 1 is flanked, means 4 and 5 to influence the transmission state of the electro-optical medium 1, a phosphor layer 8 comprising at least two phosphors on the first substrate 3, and a radiation source 7 for radiation 13 having a maximum emission at a wavelength $\lambda_1 < 360$ nm, which radiation source 7 is situated at the side of the second substrate 2, and means 6 for transforming the radiation 13 having a maximum emission at a wavelength $\lambda < 360$ nm to radiation having a maximum emission at a wavelength $\lambda_2 > 360$ nm.

In accordance with an embodiment of the invention, the two substrates may be made of glass. They are transparent to long-wave UV light having a wavelength $\lambda_2 > 380$ nm and to visible light. At the periphery, the substrates are sealed by means of a packing, which is composed, for example, of an adhesive. The substrates and the packing enclose a space which is filled with the electro-optical medium.

For the electro-optical medium use can be made of different liquid crystal materials. For example, a "twisted nematic" material which is rotated through 90° can be used for a TN-LCD or a "supertwisted nematic" material which is rotated through an angle ranging from 180 to 270° can be used for a STN-LCD, or a birefringent material rotated through 270° ("supertwisted birefringence") can be used for a SBE-LCD. Also ferro-electric liquid crystal materials can suitably be used.

The surfaces of the substrates, which are in contact with the electro-optical medium, are coated with transparent electrode strips 4 and 5, which cross each other at right angles and form a matrix of switching points. The electrodes may be made of, for example, ITO. The electrodes are covered with an orientation layer 11 of obliquely evaporated silicon oxide. Furthermore, a polarizer 9 is arranged on the second substrate 2, and an analyzer 10 is arranged on the first substrate 3.

A mercury high-pressure lamp 7, which emits UV light having a wavelength of 370 nm, is arranged at the side of the substrate 2.

In accordance with a preferred embodiment of the invention, the means for transforming the radiation is an UV phosphor.

The UV phosphor may be selected from the group formed by $Ca_{2.45}B_{5.5}P_2O_{15.75}:Ce^{3+},Li^+$; $SrB_4O_7:Eu^{2+}$; $Sr_3(PO_4)_2:Sn^{2+}$; $Ba_2Mg(BO_3)_2:Pb^{2+}$, $LaGd(BO_3)_2:Ce^{2+}$; $CaSO_4:Eu^{2+}$; $ZnO:Ga^{3+}$; $CaO:Bi^{3+}$; $(Sr,Mg)_2P_2O_7:Eu^{2+}$; $CaB_2P_2O_9:Eu^{2+}$ and $Sr_2P_2O_7Eu^{2+}$. These UV phosphors are effectively excited by the UV light having a wavelength $\lambda_1 < 360$ nm originating from the backlighting and emit UV light with a wavelength $\lambda_2 > 360$ nm having a high fluorescence quantum yield. UV light having a wavelength $\lambda_2 > 360$ nm does not cause photochemical reactions in the liquid crystal material. In Table 1, the wavelength of the emission maximum $E_m$[nm], the emission width FWHM[nm] and the quantum yield QE are indicated for these UV phosphors.

TABLE 1

| Phosphor | Em[nm] | FWHM [nm] | QE [%] |
|---|---|---|---|
| $Ca_{2.45}B_{5.5}P_2O_{15.75}:Ce^{3+}Li^+$ | 365 | 53 | 95 |
| $SrB_4O_7:Eu^{2+}$ | 370 | 19 | 92 |
| $Sr_3(PO_4)_2:Sn^{2+}$ | 378 | 65 | 30 |
| $Ba_2Mg(BO_3)_2:Pb^{2+}$ | 380 | 51 | 60 |
| $LaGd(BO_3)_2:Ce^{2+}$; | 380 | 60 | 65 |
| $CaSO_4:Eu^{2+}$ | 388 | 12 | 99 |
| $ZnO:Ga^3$ | 388 | 15 | |
| $CaO:Bi^{3+}$ | 391 | 29 | |
| $(Sr,Mg)_2P_2O_7:Eu^{2+}$ | 392 | 26 | 90 |
| $CaB_2P_2O_9:Eu^{2+}$ | 403 | 21 | 90 |
| $Ca_3(PO_4)_2:Eu$ | 412 | 33 | |

A collimator may be arranged between the backlighting and the means for transforming the wavelength, which collimator serves to improve the contrast, the color purity and the efficiency of the liquid crystal color display screen.

The front substrate 3 situated on the side facing the viewer is provided with a phosphor layer 8 on the surface adjoining the electro-optical medium. The phosphor layer 8 is composed of a mosaic pattern of pixels, which are each associated with a switching point, and which emit fluorescent light in red, green and blue when they are excited by the UV light emitted by the layer comprising the UV phosphor 6.

Efficient phosphors to generate visible light from long-wave UV light are, for the red range, $(V,P,B)O_4:Eu$, $Mg_4GeO_{5.5}F:Mn$, $YNbO_4:Eu^{3+}$; $Y_2O_2S:Eu^{3+}Y_2O_2S:Eu^{3+}$, $Eu(ttfa)_3(phen),Eu(ttfa)_3(Clphen)$ and $Eu(tfnb)_3(dpphen)$., for the blue range: $BaMgAl_{10}O_{17}:Eu$, coumarin 4, coumarin 47 and coumarin 102, and for the green range $BaMgAl_{10}O_{27}:Mn,Eu$, $Tb(bph4COO)_3(HOEt)_2$, $Tb(dmbtacn)_3(HOEt)_2$ and $Tb(benz)_3(HOEt)_2$.

TABLE 2

| | Red phosphors | | | | |
|---|---|---|---|---|---|
| red | x | y | Peak $E_m$[nm] | QE[%] | FWHM [nm] |
| $Y(V,P,B)O_4:Eu$ | .659 | .341 | 615 | | Line |
| $Mg_4GeO_{5.5}F:Mn$ | .713 | .287 | 655 | | 16 |
| $YnbO_4:Eu^{3+}$; | .659 | .341 | 615 | | Line |
| $Y_2O_2S:Eu^{3+}$ | .666 | .330 | 627 | | Line |
| $Eu(ttfa)_3(Clphen)$ | .652 | .330 | 618 | 75 | |
| $Eu(ttfa)_3(phen)$ | .652 | .329 | 619 | 72 | |
| $Eu(tfnb)_3(dpphen)$ | .657 | .326 | 618 | 64 | | ttfa = 1-(2-Thenoyl)-4,4,4-trifluoro-1,3,butanedithionate
tfnb = 4,4,4-Trifluoro-1-(2-naphtyl)-1,3-butanedithionate
Ciphen = 5-Chloro-1,10-Phenanthroline
phen = 1,10-Phenanthroline
dpphen = 4,7-Diphenyl-1,10-Phenanthroline

TABLE 3

Blue phosphors

| Blue | x | y | Peak $E_m$ | Peak Abs | FWHM [nm] | QE [%] |
|---|---|---|---|---|---|---|
| BaMgAl$_{10}$O$_{17}$:Eu | .148 | .053 | 447 | | | 51 |
| Coumarin 4 | | | 445 | 372 | | >90% |
| Coumarin 47 | | | 450 | 373 | | |
| Coumarin 102 | | | 465 | 389 | | |

Coumarin 4 = 7-Hydroxy-4-methylcoumarin
Coumarin 47 = 7-Diethylamino-4-Methylcoumarin
Coumarin 102 = 2,3,5,6-1H,4H-Tetrahydro-8-methylquinolizino-[9,9a,1-gh]-coumarin

TABLE 4

Green phosphors

| green | x | y | FWHM [nm] | Peak $E_m$[nm] | QE[nm] |
|---|---|---|---|---|---|
| BaMgAl$_{10}$O$_{27}$:Mn,Eu | .126 | .65 | 27 | 514 | |
| Tb(bph4COO)$_3$(HOEt)$_2$ | .324 | .598 | | 549 | 70 |
| Tb(dmbtacn)$_3$(HOEt)$_2$ | .332 | .603 | | 549 | 70 |
| Tb(benz)$_3$(HOEt)$_2$ | .325 | .604 | | 549 | 61 | bph4COO = Benzophenone-4-carbonate
dmbtacn = Dimethylbenzoyltriazocycloate
benz = benzoate The phosphor layers which may be provided either as points or as strips, may be bordered by a black matrix 12 so as to improve the contrast and the color purity.

The contrast at ambient light conditions can also be improved by coloring the front substrate 3.

It is further possible to provide a dielectric coating between the electro-optical medium and the phosphor layer 6, which dielectric coating is transparent to UV light and reflects visible light.

In operation, a voltage is applied between the electrodes, in accordance with the desired image. In the part of the electro-optical medium which is situated between Turned-off switching points, or at the location where the voltage is lower than the threshold voltage, the liquid crystal molecules have a twisted structure with a 90° rotation across the cross-section of the cell. In the part of the electro-optical medium which is situated between turned-on switching points, or at the location where the voltage is higher than the threshold voltage, the liquid crystal molecules have a straight structure without, or substantially without, a rotation across the cross-section of the cell.

The unpolarized UV radiation having a wavelength $\lambda_1 < 360$ nm, which is generated by the mercury low-pressure lamp 7, is absorbed in the phosphor layer 6 by the UV phosphor serving as a transformer of this UV radiation, and is emitted as light having a higher wavelength $\lambda_2 > 360$ nm. At locations in the electro-optical medium where no voltage is applied, the generated radiation passes through the polarizer, the liquid crystal medium and the analyzer before impinging in the phosphor layer 8 on a red, green or blue pixel. The pixels in the phosphor layer 8 are associated with the switching points and aligned therewith. The phosphors 8 excited by the long-wave UV light then emit visible light in one of the colors red, green or blue.

What is claimed is:

1. A liquid crystal color display screen, which is provided with an electro-optical medium, two parallel transparent substrates by which the electro-optical medium is flanked, means for influencing the transmission state of the electro-optical medium, a phosphor layer comprising at least two phosphors on the first substrate, a radiation source for emitting radiation having a maximum emission at a wavelength $\lambda_1 < 360$ nm, which radiation source is situated at the side of the second substrate, and means for transforming the radiation having a maximum emission at a wavelength $\lambda_1 < 360$ nm to radiation having a maximum emission at a wavelength $\lambda_2 > 360$ nm for impinging on the electro-optical medium.

2. A liquid crystal color display screen as claimed in claim 1, wherein the means for transforming the radiation is UV phosphor.

3. A liquid crystal color display screen as claimed in claim 1, wherein the means used to transform the radiation is an UV phosphor selected from the group formed by $Ca_{2.45}B_{5.5}P_2O_{15.75}:Ce^{3+}$, $Li^+$; $SrB_4O_7:Eu^{2+}$; $Sr_3(PO_4)_2:Sn^{2+}$; $Ba_2Mg(BO_3)_2:Pb^{2+}$; $LaGd(BO_3)_2:Ce^{2+}$; $CaSO_4:Eu^{2+}$; $ZnO:Ga^{3+}$; $CaO:Bi^{3+}$; $(Sr,Mg)_2P_2O_7:Eu^{2+}$; $CaB_2P_2O_9:Eu^{2+}$ and $Sr_2P_2O_7:Eu^{2+}$.

4. A liquid crystal color display screen as claimed in claim 1, wherein the radiation source for radiation having a maximum emission at a wavelength $\lambda_1 < 360$ nm is a mercury low-pressure lamp.

5. A liquid crystal color display screen as claimed in claim 1, wherein the electro-optical medium is a liquid crystal cell medium having a 180°–360° twist.

6. A liquid crystal color display screen as claimed in claim 1, wherein the phosphor layer comprises a red phosphor selected from the group $Y(V,P,BPO_4$:Eu; $Mg_4GeO_{5.5}F$:Mn; $YNbO_4$:$Eu^{3+}$; $Y_2O_2S$:$Eu^{3+}$; $Eu(ttfa)_3(Clphen)Eu(ttfa)_3$ (phen) and $Eu(tfnb)_3(dpphen)$.

7. A liquid crystal color display screen as claimed in claim 1, wherein the phosphor layer comprises a blue phosphor selected from the group formed by BaMgAl$_{10}$O$_{27}$:Eu, 7-hydroxy-4-methylcoumarin, 7-diethylamino-4-Methylcoumarin and 2,3,5,6-1H,4H-tetrahydro-8-methylquinolizino-[9,9a,1-gh]-coumarin.

8. A liquid crystal color display screen as claimed in claim 1, wherein the phosphor layer comprises a green phosphor selected from the group formed by BaMgAl$_{10}$O$_{27}$:Mn,Eu, Tb(bph4COO)$_3$(HOEt)$_2$, Tb(dmbtacn)$_3$(HOEt)$_2$ and Tb(benz)$_3$(HOEt)$_2$.

9. A liquid crystal display comprising:
   a radiation source which provides a first radiation having a first wavelength;
   a transforming layer which transforms said first radiation to a second radiation having a second wavelength, said second wavelength being different than said first wavelength;
   a medium that receives said second radiation;
   at least one electrode configured to control transmission state of said medium; and
   a layer that includes at least two phosphors that convert said second radiation selectively transmitted through said medium to visible light.

10. The liquid crystal display of claim 9, wherein said second wavelength is greater than said first wavelength.

11. The liquid crystal display of claim 9, wherein said second wavelength is greater than 360 nm, and said first wavelength is less than 360 nm.

12. The liquid crystal display of claim 9, wherein said transforming layer includes a UV phosphor.

13. The liquid crystal display of claim 9, wherein said transforming layer include a UV phosphor selected from the group formed by $Ca_{2.45}B_{5.5}P_2O_{15.75}:Ce^{3+},Li^+$; $SrB_4O_7:EU^{2+}$; $Sr_3(PO_4)_2:Sn^{2+}$; $Ba_2Mg(BO_3)_2:Pb^{2+}$; LaGd $(BO_3)_2:Ce^{2+}$; $CaSO_4:Eu^{2+}$; $ZnO:Ga^{3+}$; $CaO:Bi^{3+}$; $(Sr,Mg)_2P_2O_7:Eu^{2+}$; $CaB_2P_2O_9:Eu^{2+}$ and $Sr_2P_2O_7:Eu^{2+}$.

14. The liquid crystal display of claim 9, wherein said radiation source includes a mercury low-pressure lamp.

15. The liquid crystal display of claim 9, wherein said medium includes a liquid crystal cell medium having a 180°–360° twist.

16. The liquid crystal display of claim 9, wherein said layer comprises a red phosphor selected from the group $Y(V,P,B)O_4:Eu$; $Mg_4GeO_{5.5}F:Mn$; $YNbO_4:Eu^{3+}$; $Y_2O_2S:Eu^{3+}$; $Eu(ttfa)_3(Clphen)Eu(ttfa)_3(phen)$ and $Eu(tfnb)_3(dpphen)$.

17. The liquid crystal display of claim 9, wherein said layer comprises a blue phosphor selected from the group formed by $BaMgAl_{10}O_{27}:Eu$, 7-hydroxy-4-methylcoumarin, 7-diethylamino-4-Methylcoumarin and 2,3,5,6-1H,4H-tetrahydro-8-methylquinolizino-[9,9a,1-gh]-coumarin.

18. The liquid crystal display of claim 9, wherein said layer comprises a green phosphor selected from the group formed by $BaMgAl_{10}O_{27}:Mn,Eu$, $Tb(bph4COO)_3(HOEt)_2$, $Tb(dmbtacn)_3(HOEt)_2$ and $Tb(benz)_3(HOEt)_2$.

19. A liquid crystal display comprising:

a back substrate having a radiation source on a first side and a transforming layer on a second side, said radiation source providing a first radiation having a first wavelength, and said transforming layer transforming said first radiation to a second radiation having a second wavelength, said second wavelength being different than said first wavelength;

a front substrate having a phosphor layer that includes at least two phosphors that convert said second radiation to visible light;

a medium located between said transforming layer and said phosphor layer, said medium being sandwiched between two electrodes configured to control transmission state of said medium.

20. The liquid crystal display of claim 19, wherein said transforming layer includes a UV phosphor.

* * * * *